G. C. WING & F. W. HEMPY.
STREET CAR AND SIMILAR VEHICLE.
APPLICATION FILED MAR. 10, 1909.
965,972.
Patented Aug. 2, 1910.
2 SHEETS—SHEET 1.
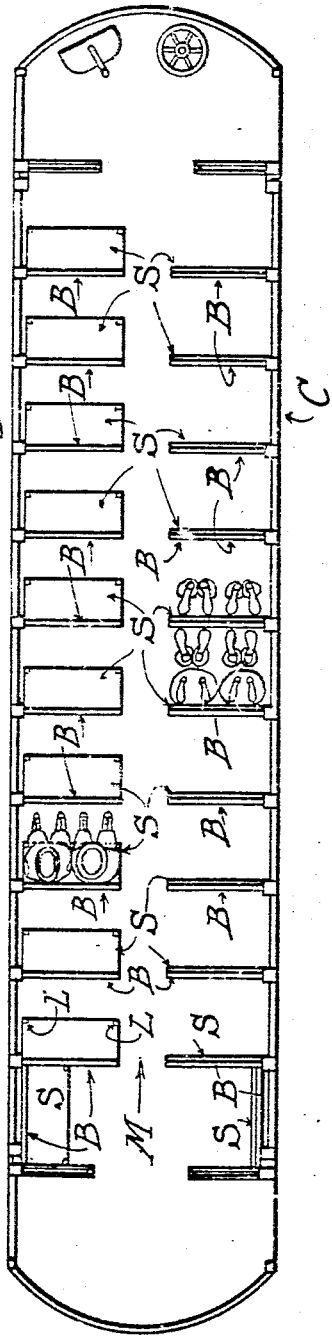
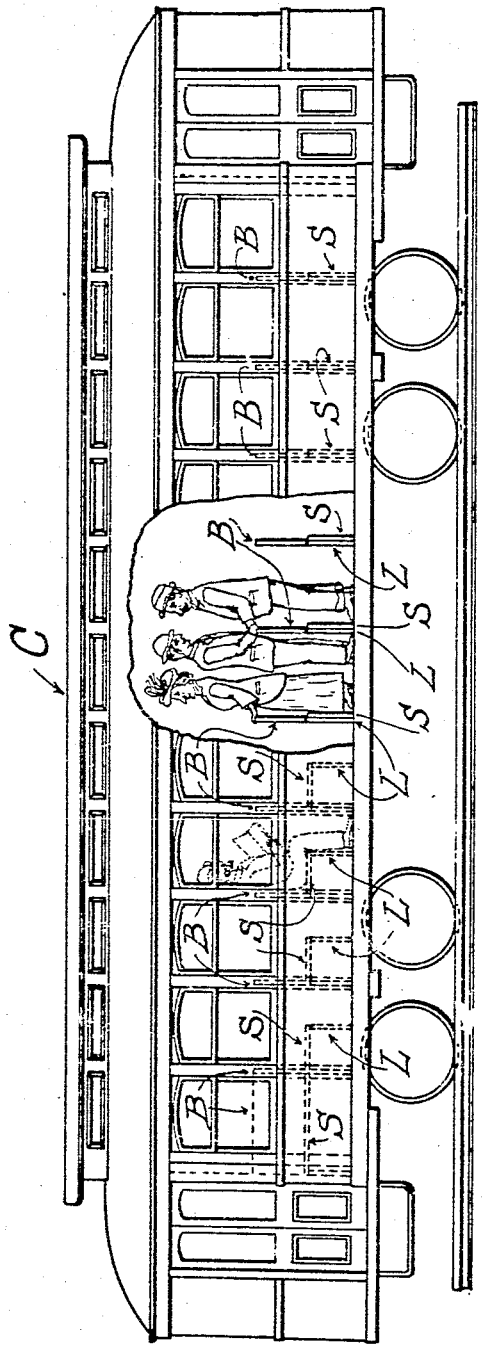
WITNESSES:
INVENTORS
Frederick W. Hempy
George C. Wing
BY
George C. Wing
ATTORNEY

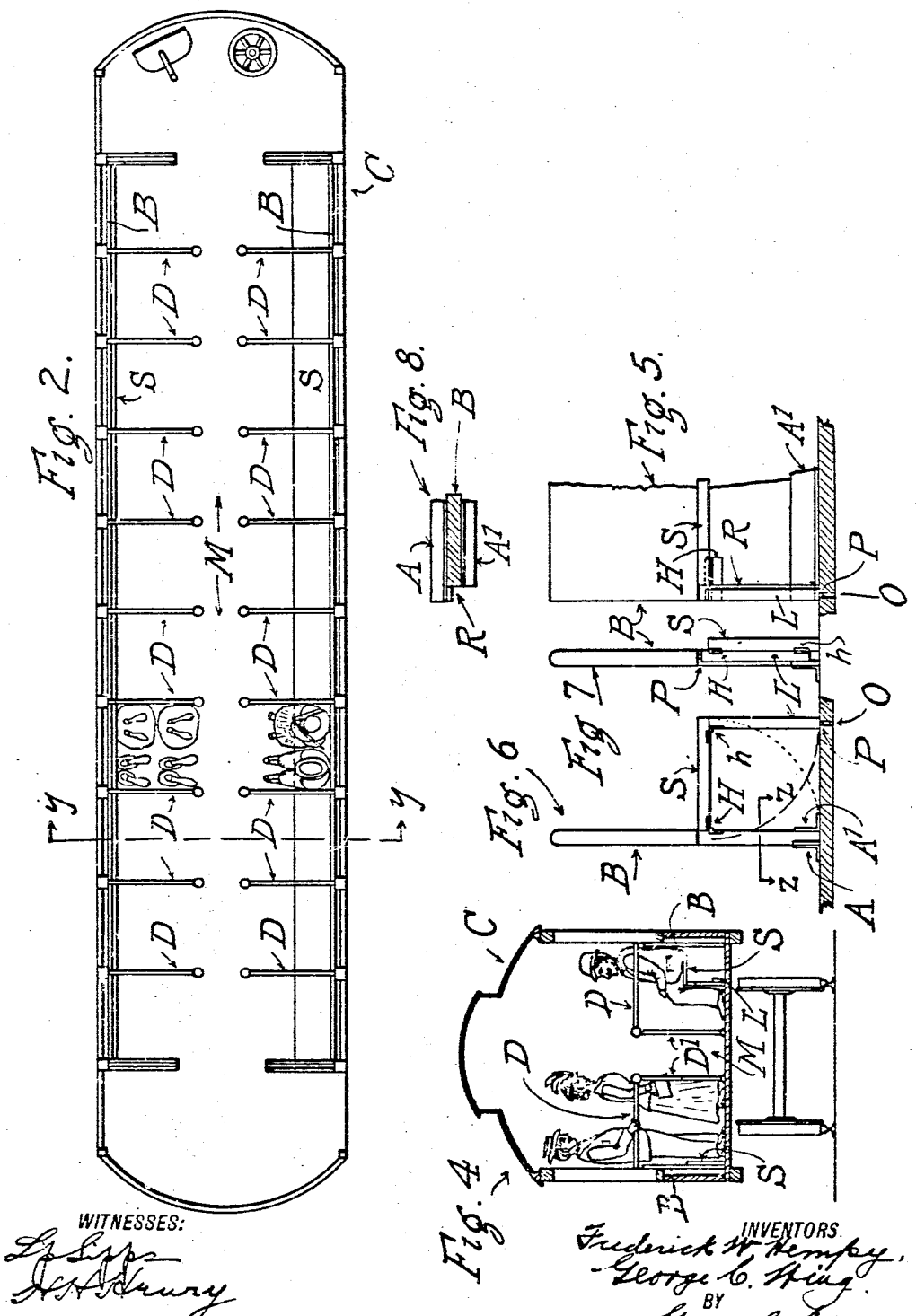

UNITED STATES PATENT OFFICE.

GEORGE C. WING AND FREDERICK W. HEMPY, OF CLEVELAND, OHIO, ASSIGNORS TO SAID WING, TRUSTEE.

STREET-CAR AND SIMILAR VEHICLE.

965,972. Specification of Letters Patent. Patented Aug. 2, 1910.

Application filed March 10, 1909. Serial No. 482,562.

*To all whom it may concern:*

Be it known that we, GEORGE C. WING and FREDERICK W. HEMPY, both citizens of the United States, residing at the city of Cleveland, in the county of Cuyahoga and State of Ohio, have together invented a new and useful Improvement in Street-Cars and Similar Vehicles, as to which we hereby declare the following to be a full, clear, and exact description, due reference being had to the several drawings accompanying and making a part of the specification, wherein it is to be understood similar reference-letters are in each case used to denote similar parts.

Our invention applies and more especially relates to the requirements of street car service in modern cities or large popular centers, where congestion occurs, and is to be relieved, either occasionally, as to and from excursion or exhibition points, base-ball games, and other gathering-places, and attractions; or, regularly, during the rush-hours at the general close of business. On these occasions, the first demand is not so much the manner and comfort, as the promptness and speed with which passengers are handled, and, few if any, enter a car—at these times—with any expectation of gaining a seat, or without being fully prepared to stand during the whole or the greater part of the transit. This now thoroughly recognized and accepted condition of course works injustice—under modern railway systems, which, because of the prevailing type of vehicles used, take no account of the difference in the treatment passengers receive, and, at the same time, impose the same tariff, alike on those who stand, *en route,* as on the more fortunate who enjoy seats and a correspondingly increased comfort to their journey's end.

It is the purpose of our present invention to provide a car that is adapted to the emergency conditions in traffic above referred to, and which shall so standardize and equalize such conditions, that transportation companies may take advantage of the recognized willingness of the traveling public to stand, on occasion, and, by employing our form of car, be able to make a low-fare to such class of its patrons as compared with the fare on cars where seats are provided. A further and, perhaps, greater value of the invention, is the large increase in the passenger capacity of cars thereby to be obtained, and, the consequent ability to reduce congestion along travel lines, and, to a degree, that will go far toward solving a problem of rapidly growing importance in all cities, but which, hitherto, has been without the power of traffic managers to meet.

In the several drawings, Figure 1 is an elevation of a car, with an interior view through a broken portion thereof. Fig. 2 is a floor-plan view of a car, covering our invention, when one side is arranged for sitting and the other side for standing passengers. Fig. 3 is a similar view of a different arrangement for the same purpose. Fig. 4 is a cross-sectional view of Fig. 2 on the line $y, y$, thereof, in the direction of the arrows. Fig. 5 is a fragmentary front view of the end of a specific form of collapsible seat, applicable to said car. The view is of a seat when opened, whether the same is lengthwise or cross-wise of a car. Fig. 6 is an end view of Fig. 5. Fig. 7 is a like view of the seat shown in Fig. 5, when collapsed and, Fig. 8 is a sectional view, in the direction of the arrows, on the lines $z, z$, of Fig. 6.

C is a car as a whole of the type and, similar to those in general use, except in the respects hereinafter more particularly pointed out. Referring to Fig. 2 the interior plan there displayed is of a specific form or adaptation of our invention. It consists, in the first instance, of a series of rigid upright balustrade-like supports or sections that extend at intervals from the sides of the car toward the middle, at right angles to said sides. In the figures these supports are made up of a horizontal hand-rail D, firmly affixed to the side of the car, at one end, at a height from the floor to be conveniently grasped by a passenger when standing, and joined to, and sustained, at the other end, by upright balusters or posts D'. The latter are likewise rigidly fastened to the floor at their lower ends. The intervals, or spaces, between these several divisional members of the series in question, may be as desired, but, doubtless, will usually be made of a width to comfortably accommodate two people when side by side cross-wise of the same, and of a depth, transversely of the car, to permit two people to stand along and against each hand-rail of any pair of said rails or supports in the series. Further, said intervals must not be so wide that, when the space is without a seat, or its seat is collapsed, a passenger cannot reach and grasp one of said handrests, or divisional members, when standing between a given pair of the same. By this arrangement, as will be manifest, not only is a firm support provided for standing passengers, but also, as is most important under such conditions, the mass of passengers itself is thereby divided up into small units and the individuals composing each unit securely protected in their places against crowding or disturbance by other passengers. A passageway, or aisle M, may be left as shown centrally of the car between the two series of supports just described. Beneath said hand-rails D, lengthwise of the car, along its sides, are arranged collapsible seats or benches S. As indicated in the figures these seats are, in this case, composed of one continuous piece S, but, it will be manifest that, said piece may be broken up into several separate and shorter benches, or seats, each of which is constructed substantially as when but one long bench-like member is used. Said seat, or part S, is shown (Figs. 2, 4, 5, 6) as fastened, by downwardly closing hinges H, to a back-piece B, that extends along the side of the car throughout its length. This back-piece reaches to the floor, except at the ends where it is cut away, or notched, vertically through the lower portion, as at R, to receive the leg L of the seat, when the seat is collapsed. It is evident that provision may be made for this purpose in other ways, as, for instance, by having recesses or mortise-like spaces in said part B, or by allowing said part to extend no lower than the point at which the seat S, is hinged thereto. Said seat S, just described, is shown as supported by legs L, fastened to the same by inwardly closing hinges h. The length of the legs will, of course, bear such proportion to the width of the seat S, that when folded beneath the same they will lie flatly against the under face of the seat. In order to steady the legs in their operative position pivots P are placed in their lower ends to fit into holes O in the car floor. Of course suitable means of latching or locking the seats S in their collapsed places will be provided.

Another arrangement of the same nature as the above, is illustrated in Figs. 1 and 3 wherein the seats, instead of running lengthwise of the car, run transversely or crosswise thereof, toward the central passage, in the manner in familiar use. Here the backs of the seats S (Figs. 5, 6, 7) also serve as the divisional supports and rests for the passengers—in place of the open hand-railing made up of D and D'—when the car is converted from a seated to a seatless condition. The said back-piece B, when extended to the floor, may be firmly fastened thereto, by the outer and inner bracket A and A' (Figs. 6, 7 and 8). In the drawings the bracket A (Fig. 8) extends across, or overlaps, the notched space, on the piece B, above described. The details shown in the drawings, as explanatory of the car when equipped with longitudinal seats, are also applicable, for the purpose, to the arrangement now under consideration. In the latter case, the seats do not extend beneath said supports, but collapse against, or within the latter, which, as said, compose the back itself for the seats when these are brought into use.

The seats shown in the drawings are collapsed, of course, by simply pressing the legs L inwardly, along the dashed line in Fig. 6, beneath and against the hinged seat S, which is then allowed to fall (in the direction of the dotted line of Fig. 6) into a vertical position, within the notched end of the back B. The operation will likewise carry and include the legs L, whose heels or hinged ends, will engage and be stopped by the overlapping end of the bracket A (Fig. 8) and thus be held firmly in their upright and folded relation to the back B (Fig. 7) without being free to vibrate or rattle.

It is evident, of course, that by the arrangements explained, a car may be readily converted from a car with seats to one without, but adapted to standing passengers, and, vice versa. Such conversion, however, it will be understood, in no case need be entire in order to fill the requirements of and embrace our invention, as it is intended to claim the same, for, the invention equally covers the application of the supports described to a car that is provided at the same time, through one portion, with fixed seats, and, through another, with said supports either with or without collapsible seats connected therewith. A modification or application of the idea has especial value also in connection with the rear or front platform of street cars, for the accommodation of passengers standing there, or as adjunctive to pay-enter systems. Thus, a very practical and desirable arrangement and combination would be to have a series of cross-seats at one part of the car, on one or both sides of the central aisle, and our rigid transverse hand-rests, as tributary thereto, across the aisle, or forwardly, or at the rear of such seats; or, to equip one portion of the floor space with a longitudinal side-seat, or seats, or, with both longitudinal and cross seats, and the remaining portion with said supports at right angles to and perhaps extending above and across the longitudinal seats.

A car that dispenses with seats, according to our invention, and is equipped with rigid or firm supports of any character that will enable passengers to uphold and steady themselves in a standing posture, is, in itself, a highly useful and complete instrumentality in the art concerned. The feature, however, of convertibility, that the invention further includes, is of great additional value, in a commercial sense, especially, inasmuch as it enables the same car, that has performed emergency service as a low-fare stand-up car, when such emergency or service is over, for the time being, to be at once used, as an ordinary passenger car fully equipped with seats and other accommodations of high-fare cars. The car itself, by reason of its convertibility, is thus always in commission, and, unlike snow-plows, sprinklers and other strictly emergency or intermittent properties of a transportation company, it will have no idle periods but can be kept in continuous and productive use.

It will be obvious that the various details we have here shown, are not to be taken as limitations of our invention in the broader sense. Any vehicle for the transportation of passengers, whether a street car, subway-car, automobile or other conveyance that is provided with firm or rigid supports or bearings whereby the passengers can steady themselves in an upright or standing position, en route, and resist being unduly swayed, staggered or carried from their places by the mass or the motion, is equally within the invention as broadly claimed, and, this, without regard to the particular methods or manner of collapsing the seats, or whether seats are used or provided at all. It is likewise not intended to restrict the supports or bearings referred to to any particular material, like wood or metal, but taut ropes, for instance, it is conceivable might be employed as such supports without a departure from the idea sought to be patented. Said supports are to be considered as transverse in the sense intended in these specifications whether they extend clear across the floor-space or over but a portion thereof as when an aisle, either centrally or at the sides, intervenes.

It is to be understood that we do not intend to cover by the foregoing description nor to include in our invention as herein claimed, but to distinctly disclaim, rigid supports for standing passengers, or any combination of which such supports are an element, when they serve as transverse members of a series or system of supports for standing passengers in direct connection with hand-rails or rests that serve as longitudinal members of such series or system, or when such supports are arranged other than transversely of the car or vehicle.

What said invention is intended to cover and what we desire to secure by Letters Patent is:—

1. The combination of a street-car, or similar vehicle, provided with seats along the sides longitudinally of said car, and a series of parallelly arranged hand-rests for standing passengers in front of said seats and transversely of said car, substantially as shown and described.

2. In combination with a street-car, or similar passenger vehicle, provided with a series of transversely arranged hand-rails, a collapsible seat through and beneath said handrails, substantially as shown and described.

3. In combination with a street-car, or similar passenger vehicle, provided with a series of transversely arranged handrails, a collapsible seat through and beneath said handrails longitudinally of said car, substantially as shown and described.

4. A street car or similar vehicle having transverse handrests at suitable distances one from the other to be reached and grasped by passengers when standing at any point between the same, and seats collapsibly connected to said handrests, substantially as shown and described.

5. The combination, with a street car or similar vehicle, of a series of transversely arranged handrests each member of which series is at a suitable distance from the next adjoining member to enable passengers to stand at any point between the same and grasp said handrests, and seats collapsibly connected to said handrests along their transverse dimensions, substantially as shown and described.

GEORGE C. WING.
FREDERICK W. HEMPY.

In presence of—
FRANK H. HEMPY,
S. M. SMITH.